United States Patent
Shepherd

(10) Patent No.: US 7,105,036 B2
(45) Date of Patent: Sep. 12, 2006

(54) DRIFT ELIMINATOR, LIGHT TRAP, AND METHOD OF FORMING SAME

(75) Inventor: Gregory Maury Shepherd, Houston, TX (US)

(73) Assignee: C. E. Shepherd Co., Inc., Houston, TX (US)

(*) Notice: Subject to any disclaimer, the term of this patent is extended or adjusted under 35 U.S.C. 154(b) by 0 days.

(21) Appl. No.: 10/728,895

(22) Filed: Dec. 8, 2003

(65) Prior Publication Data

US 2005/0120688 A1 Jun. 9, 2005

(51) Int. Cl.
*B01D 45/00* (2006.01)

(52) U.S. Cl. .............................. 55/343; 55/440; 55/464

(58) Field of Classification Search ................. 55/342, 55/343, 440, 464; 454/282, 905
See application file for complete search history.

(56) References Cited

U.S. PATENT DOCUMENTS

| | | | |
|---|---|---|---|
| 2,793,017 A | 5/1957 | Lake | |
| 3,206,536 A | 9/1965 | Goodloe | |
| 3,262,682 A | 7/1966 | Bredberg | |
| 3,346,246 A | 10/1967 | Loetel et al. | |
| 3,359,616 A | 12/1967 | Butt | |
| 3,415,502 A | 12/1968 | Munters | |
| 3,475,012 A | 10/1969 | Britton et al. | |
| 3,540,702 A | 11/1970 | Uyama | |
| 3,738,626 A | 6/1973 | Norback | |
| 3,785,620 A | 1/1974 | Huber | |
| 3,862,280 A | 1/1975 | Polovina | |
| 3,952,077 A | 4/1976 | Wigley | |
| 3,983,190 A | 9/1976 | Norback | |
| 4,021,282 A | 5/1977 | Norback | |
| 4,021,590 A | 5/1977 | Vangbo | |
| 4,025,668 A | 5/1977 | Norback | |
| 4,072,478 A | * 2/1978 | Regehr et al. | ............... 55/440 |
| 4,240,814 A | * 12/1980 | Regehr et al. | ............... 55/423 |
| 4,304,738 A | 12/1981 | Nutter | |
| 4,427,607 A | 1/1984 | Korsell | |
| 4,512,938 A | 4/1985 | Jones et al. | |
| 4,548,766 A | 10/1985 | Kinney, Jr. et al. | |
| 4,557,878 A | 12/1985 | Fulkerson | |
| 4,562,015 A | 12/1985 | Lefevre | |
| 4,581,051 A | 4/1986 | Regeher et al. | |
| 4,663,092 A | 5/1987 | Kinney, Jr. et al. | |
| 4,668,443 A | 5/1987 | Rye | |
| 4,670,197 A | 6/1987 | Stackhouse | |

(Continued)

OTHER PUBLICATIONS

Gary R. Mirsky et al., "Film Fill", Cooling Tower Institute 1990 Annual Meeting, Feb. 5-7, 1990, pp. 1-15 plus Appendix, Technical Paper No. TP90-11.

(Continued)

*Primary Examiner*—Robert A. Hopkins
(74) *Attorney, Agent, or Firm*—Foley & Lardner LLP

(57) ABSTRACT

A drift eliminator is provided in which water laden air which enters the drift eliminator exits the drift eliminator having less than about 0.01% of water by volume therein. The drift eliminator is formed of sheets which are manufactured such that they can be nested in each other to create substantially no gap between sheets of adjacent air channel modules. As a result, a plurality of air channel modules can be combined, by nesting, to create a larger drift eliminator, without sacrificing the precision to which entrained water may be removed from air passing through the drift eliminator. In an alternate embodiment, a light trap is also provided which enables air, but substantially no light, to pass through air channels formed therein.

31 Claims, 6 Drawing Sheets

U.S. PATENT DOCUMENTS

| | | | |
|---|---|---|---|
| 4,708,832 | A | 11/1987 | Norback |
| 4,801,410 | A | 1/1989 | Kinney, Jr. et al. |
| 4,826,636 | A | 5/1989 | Kinney, Jr. et al. |
| 4,905,313 | A | 2/1990 | Stackhouse |
| 4,915,877 | A | 4/1990 | Shepherd |
| 4,950,430 | A | 8/1990 | Chen et al. |
| 5,013,492 | A | 5/1991 | Gay et al. |
| 5,028,356 | A | 7/1991 | Wiltz |
| 5,104,588 | A | 4/1992 | Kinney, Jr. |
| 5,112,538 | A | 5/1992 | Thomas |
| 5,147,583 | A | 9/1992 | Bugler, III et al. |
| 5,185,105 | A | 2/1993 | Peterson |
| 5,217,788 | A | 6/1993 | Rye |
| 5,230,725 | A | 7/1993 | Chowaniec |
| 5,242,627 | A | 9/1993 | Lundin |
| 5,312,464 | A | 5/1994 | Gay |
| 5,320,651 | A | 6/1994 | Drummond |
| 5,454,987 | A | 10/1995 | Cornwell, Jr. |
| 5,474,832 | A | 12/1995 | Massey |
| 5,500,402 | A | 3/1996 | Vangbo |
| 5,770,117 | A | 6/1998 | Phelps |
| 5,963,641 | A | 10/1999 | Crandall et al. |
| 6,022,392 | A | 2/2000 | Wurz |
| 6,260,830 | B1 | 7/2001 | Harrison et al. |
| 6,407,820 | B1 | 6/2002 | Hansen et al. |
| 6,409,157 | B1 | 6/2002 | Lundin et al. |
| 6,411,314 | B1 | 6/2002 | Hansen et al. |
| 6,429,947 | B1 | 8/2002 | Laverty et al. |
| 6,460,832 | B1 | 10/2002 | Mockry et al. |
| 6,462,756 | B1 | 10/2002 | Hansen et al. |
| 6,480,291 | B1 | 11/2002 | Daniels et al. |
| 6,502,807 | B1 | 1/2003 | Assaf et al. |
| 6,509,974 | B1 | 1/2003 | Hansen |
| 6,517,058 | B1 | 2/2003 | Engh et al. |
| 6,544,628 | B1 | 4/2003 | Aull et al. |
| 6,622,508 | B1 | 9/2003 | Dinnage et al. |
| 6,640,427 | B1 | 11/2003 | Aull et al. |

OTHER PUBLICATIONS

Michel Monjoie et al., "Fouling Film Fill", Cooling Tower Institute 1993 Annual Meeting, Feb. 17-19, 1993, pp. 1-15 plus Appendix, Technical Paper No. TP93-06.

Product Catalogs, http://www.brentwoodindustries.com/cool/cat2.htm, Cooling Tower Media, 3 pages, Nov. 20, 2003.

Product Catalogs, http://www.brentwoodindustries.com.cool/cat3.htm, Cellular Drift Eliminators, 4 pages, 1999.

Product Catalogs, http://www.brentwoodindustries.com.cool/cat3.htm, Cellular Drift Eliminators, 3 pages (Nov. 20, 2003).

* cited by examiner

DRIFT ELIMINATOR, LIGHT TRAP, AND METHOD OF FORMING SAME

BACKGROUND OF THE INVENTION

The discharge of suspended or entrained water in air exiting a cooling tower is referred to, in the cooling tower industry, as "drift." Devices that reduce drift are known to as "drift eliminators" or "drift reduction units" ("DRUs"). Drift eliminators are a integral component of both cross-flow and counter-flow water cooling towers. A properly performing DRU removes most of the water in an exit air stream leaving a cooling tower. Specifically, DRUs should be capable of lowering the entrained water to approximately 0.005% of the total operating gallons per minute of the cooling tower.

Drift emissions requirements, which are often mandated by environmental regulations, are significant factors in cooling tower design and operation. In one design, DRUs are stacked into cooling towers to form a continuous wall of separation between the cooling media and the fan discharging the exit air. Installation of the DRU is accomplished by stacking air channel modules into the cooling tower frame supporting the units so that the individual modules are tightly connected at their adjoining edges. The ability of a DRU to form a tight seal at the interface of the adjoining edges is dependant upon the geometry and construction of the individual DRU. Further, the degree to which the adjoined edges are sealed directly impact the DRU's ability to remove entrained water in the air exiting the cooling media. Ideally, there would be no leaks in this wall, as even small amounts of air bypassing the DRUs will result in moisture discharge that is in excess of allowable limits.

One previous DRU design included a generally sinusoidal air channel design which was constructed with the edge of each air channel module being finished with a flat sheet of material. The flat sheets were provided due to the inability to nest adjacent air channel modules effectively, without creating a gap between the modules. The flat sheets formed joint interfaces between the adjoining edges of the modules or at an otherwise exposed end thereof. However, this design was deemed unsatisfactory due to the inability to seal the flat sheets interfaces between mating modules completely and effectively, i.e., as the sinusoidal channel were not uniformly formed, they created an irregular edge at the end of each module that could not be effectively sealed against an adjoining module.

One such first generation DRU design was manufactured using a dual interlocking belt forming machine that, when compressed, created generally matching thermoformed sheets. Unfortunately, the matching sheets had inconsistent depths and undesirable dimensional variances between successive curves in the individual sheets used to form the air channels. As a result of the irregular surface of the original thermoformed parts: (a) the sinusoidal ends of these thermoformed sheets could not nest tightly together to form a completely water-tight seal and; (b) the flat sheets glued to the ends of the modules (which were used to attempt to create a water-tight seal) did not form a straight, parallel interface between modules and thereby allowed water laden air to slip through the drift eliminators and exit the cooling tower stack creating drift. In other words, the irregularities prevented the finished modules from nesting or mating close enough at the flat end sheets to prevent air leakage between the modules. As a result, sales of this first generation product were eventually discontinued because it could not consistently attain the required drift reduction levels for modern cooling towers.

As a result of the discontinuation of the first generation design, the industry turned to a plurality of second generation designs. In one such second generation design, long components having a middle portion with a substantially inverted V-shaped cross sections are employed. Air channels pass though the components in the direction perpendicular to the components' length. As a result, a middle portion of the air channels has a substantially inverted V-shape. Moreover, as the channels' inlet and outlets are positioned in horizontal passages connected to the base of the inverted V, the air channel has three turns: one where the inlet passage meets a first side of the base, one at the pinnacle of the inverted V and one where the second side of the base meets the outlet passage.

This inverted V shape facilitates nesting of other like shaped components on top of one another. However, to avoid the problems in the first generation embodiment, the components have to be as long as the cooling tower chamber into which they are to be used. In other words although the components can be nested one on top of another, modules of these components can not be nested side-by-side in a cooling tower without an unacceptable gap being created between the modules.

Unrelated to the drift elimination concerns of cooling towers, a device has long been sought to be used in commercial chicken houses which can provide ventilation while serving as a light trap and which can engage other similar devices without enabling light to pass between the devices. Light traps are necessary in commercial chicken houses to facilitate simulating multiple day cycles in a single 24 hour period. By exposing the chickens to a 12 hour "day," the chickens lay twice as many eggs per 24 hour period. To effectively convince the chickens that the "day" is 12 hours, the chickens need to be exposed to six hour light cycles, i.e., six hours of light, six hours of darkness, six hours of light, and six hours of darkness, during each 24 hour period. However, to create a six hour darkness period effectively during actual daylight hours, the walls of the chicken house must not transmit any light, while at the same time provide ventilation.

Currently, ventilation walls in chicken houses are formed from a series of components each of which, on it own, serves sufficiently well as a ventilating light trap. However, when the components are placed against each other to create the ventilation wall, gaps are created between the components. The gaps enable an unacceptable amount of light to pass between the component, thereby enabling the chickens to know that it is "day" when they should be under the impression that it is "night."

SUMMARY OF THE INVENTION

One embodiment of the invention addresses a drift eliminator which includes a first plurality of air channel modules, each module comprising a plurality of air channels and at least one planar sheet positioned between two of the air channel modules. When air containing entrained water flows through the air channels, the air exiting the air channels contains less than about 0.01% entrained water by volume. The air channel modules are formed by a series of undulating sheets. A last sheet of the first plurality of air channel modules is configured to nest in a primary sheet of a second plurality of air channel modules so that substantially no gap is formed between the first sheet and the second sheet.

In a further embodiment of the drift eliminator, the air passing through the air channels may travel in a non-linear path.

In another further embodiment of the drift eliminator, the air passing through the air channels may travel in a non-linear path which may have at least one portion which defines an upward direction.

In another further embodiment of the drift eliminator, the series of undulating sheets may include: (a) a first plurality of sheets having an undulating shape creating a series of alternating peaks and troughs; and (b) a second plurality of sheets having an undulating shape creating a series of alternating peaks and troughs. The sheets of the first and second pluralities of sheets of the first plurality of air channel modules may be alternately stacked. The troughs of the sheets in the first and second pluralities of sheets of the first plurality of air channel modules may abut each other, thereby creating the air channels between the peaks of the first and second pluralities of sheets of the first plurality of air channel modules.

In another further embodiment of the drift eliminator, the drift eliminator may also include a second plurality of air channel modules. The second plurality of air channel modules may include: (a) a first plurality of sheets having an undulating shape creating a series of alternating peaks and troughs; and (b) a second plurality of sheets having an undulating shape creating a series of alternating peaks and troughs. The sheets of the first and second pluralities of sheets of the second plurality of air channel modules may be alternately stacked. The troughs of the sheets in the first and second pluralities of sheets of the second plurality of air channel modules may abut each other, thereby creating the air channels between the peaks of the first and second pluralities of sheets of the second plurality of air channel modules.

In another further embodiment of the drift eliminator, the last sheet of the first plurality of air channel modules is nested in the primary sheet of the second plurality of air channel modules.

In another further embodiment of the drift eliminator, the drift eliminator may include at least one planar sheet positioned between two of the air channel modules in the second plurality of air channel modules.

In another further embodiment of the drift eliminator, a planar sheet may be between each of the air channel modules in the first plurality of air channel modules and a planar sheet may be between each of the air channel modules second plurality of air channel modules.

In another further embodiment, the last sheet of the first plurality of air channel modules and the primary sheet of the second plurality of air channel modules may be effectively joined without being bonded, glued, sealed, or caulked.

In another further embodiment, as a result of the last sheet of the first plurality of air channel modules being nested in the primary sheet of the second plurality of air channel modules, a substantially airtight seal may be created between the last sheet of the first plurality of air channels and the primary sheet of the second plurality of air channels, provided that lateral movement of the first and second air channel modules is substantially inhibited.

In another further embodiment of the drift eliminator, the air exiting the air channels contains less than about 0.005% entrained water by volume.

In another further embodiment, the air channel modules may be formed via a vacuum thermoforming process.

The invention also addresses an apparatus which includes a first plurality of air channel modules and a second plurality of air channel modules. The first plurality of air channel modules includes: (a) a first plurality of sheets having an undulating shape creating a series of alternating peaks and troughs; and (b) a second plurality of sheets having an undulating shape creating a series of alternating peaks and troughs. The sheets of the first and second pluralities of sheets of the first plurality of air channel modules are alternately stacked. The troughs of the sheets in the first and second pluralities of sheets of the first plurality of air channel modules abut each other, thereby creating the air channels between the peaks of the first and second pluralities of sheets of the first plurality of air channel modules. The second plurality of air channel modules includes: (a) a first plurality of sheets having an undulating shape creating a series of alternating peaks and troughs; and (b) a second plurality of sheets having an undulating shape creating a series of alternating peaks and troughs. The sheets of the first and second pluralities of sheets of the second plurality of air channel modules are alternately stacked. The troughs of the sheets in the first and second pluralities of sheets of the second plurality of air channel modules abut each other, thereby creating the air channels between the peaks of the first and second pluralities of sheets of the second plurality of air channel modules. A last sheet of the first plurality of air channel modules is nested in a primary sheet of the second plurality of air channel modules such that substantially no gap is created between the last sheet and the primary sheet.

In a further embodiment of this apparatus, the apparatus may include at least one planar sheet positioned between two of the air channel modules in the first plurality of air channel modules and at least one planar sheet positioned between two of the air channel modules in the second plurality of air channel modules.

In another further embodiment of this apparatus, a planar sheet may be between each of the air channel modules in the first plurality of air channel modules and a planar sheet may be between each of the air channel modules second plurality of air channel modules.

In another further embodiment of this apparatus, the air passing through the air channels may travel in a non-linear path.

In another further embodiment of this apparatus, the air passing through the air channels may travel in a non-linear path which may have at least one portion which defines an upward direction.

In another further embodiment of this apparatus, when air containing entrained water flows through the air channels in the first and second pluralities of air channel modules, the air which exits the first and second pluralities of air channel modules contains less than about 0.01% of water by volume.

In another further embodiment of this apparatus, when air containing entrained water flows through the air channels in the first and second pluralities of air channel modules, the air which exits the first and second pluralities of air channel modules contains less than about 0.005% of water by volume.

In another further embodiment of this apparatus, the air channels may be configured such that substantially no light may pass through the air channels.

In another further embodiment of this apparatus, the first and second pluralities of air channel modules may be formed via a vacuum thermoforming process.

The invention also address a method embodiment of forming an apparatus. This method includes: (a) providing a first plurality of air channel modules, the first plurality of air channel modules having a last sheet; (b) providing a second plurality of air channel modules, the second plurality of air channel modules having primary sheet; and (c) nesting the primary sheet in the last sheet such that substantially no gap is created between the primary sheet and the last sheet, thereby forming a apparatus.

In a further embodiment of this method, the method may include: (d) inputting water laden air into the apparatus; and (e) exhausting air from the apparatus. The exhausted air may contain less than about 0.01% of water by volume. Further, the exhausted air may contain less than about 0.005% of water by volume.

In another further embodiment of this method, the first plurality of air channel modules may include a plurality of sheets and the method may further include: thermoforming the plurality of sheets of the first plurality of air channels or vacuum-forming the plurality of sheets of the first plurality of air channels.

In another further embodiment of this method, the second plurality of air channel modules may include a plurality of sheets and the method may further include: thermoforming the plurality of sheets of the second plurality of air channels; or vacuum-forming the plurality of sheets of the second plurality of air channels.

In another further embodiment of this method, the apparatus may be configured to be a drift eliminator or a light trap.

The invention also address another method embodiment. This method includes: (a) providing a first plurality of air channel modules, the first plurality of air channel modules having a last sheet; (b) providing a second plurality of air channel modules, the second plurality of air channel modules having primary sheet; (c) nesting the primary sheet in the last sheet such that substantially no gap is created between the primary sheet and the last sheet, thereby forming a drift eliminator; (d) inputting water laden air through the drift eliminator; and (e) exhausting air from the apparatus. The exhausted air contains less than about 0.01% of water by volume.

In a further embodiment of this method, wherein the exhausted air contains less than about 0.005% of water by volume.

The invention also address a light trap which includes at least two air channel modules comprising a plurality of sheets comprising at least a first sheet, a second sheet, and a third sheet. Each of the sheets comprises a series of troughs and peaks. The sheets are arranged such that the troughs of the first sheet abut the troughs of the second sheet and the peaks of the second sheet abut the peaks of the third sheet, to create a plurality of air channels. The sheets are formed such that a last sheet of a first air channel module may be nested in a primary sheet of a second air channel module so that substantially no light may pass between the sheets or through the air channels.

In a further embodiment of the light trap, the air channels may include at least three turns or at least four turns.

In another further embodiment of the light trap, the air channel modules may be formed via a vacuum thermoforming process.

In another further embodiment of the light trap, the light trap may be configured to be used in a chicken house.

These and other features, aspects, and advantages of the present invention will become more apparent from the following description, appended claims, and accompanying exemplary embodiments shown in the drawings.

DETAILED DESCRIPTION OF PREFERRED EMBODIMENTS

Figure 1:
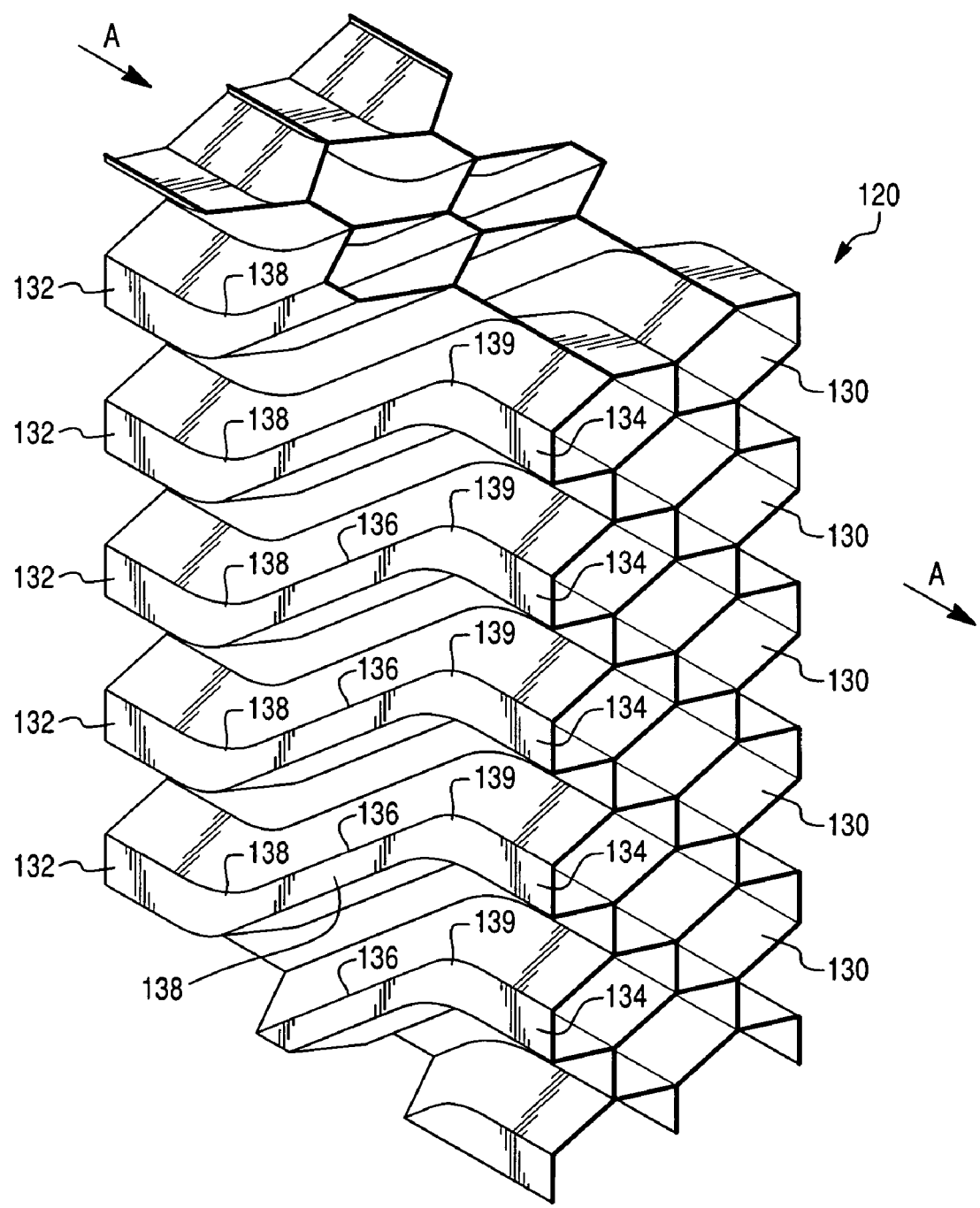
FIG. 1 is a perspective view of an air channel module containing a plurality of air channels.

Presently preferred embodiments of the invention are illustrated in the drawings. An effort has been made to use the same reference numbers throughout the drawings to refer to the same or like parts.

An embodiment of a DRU system 100 is shown in FIGS. 1–5. This system 100 benefits from an improved manufacturing process by which the previously leakage problems of the first generation sinusoidal DRU are avoided. This DRU system 100 is manufactured using an advanced vacuum thermoforming machine which is capable of accurately and consistently producing the desired sinusoidal air channel shape from a sheet of PVC. Further, as later explained in detail, as a result of the precision used in creating the channels, the channels are able to nest together to form a substantially leak-proof seal between air channel modules. Moreover, as a result of the substantially leak-proof nesting, this DRU system 100 increases the overall performance over the first generation DRU by eliminating the module-to-module interface leak which, in turn, reduces the pressure drop of the air passing through the DRU and increases the elimination of entrained water in the air exiting the cooling tower.

The entrained water is removed through a kinetic separation process that forces the air exiting the cooling media through a series of curved channels forming an air channel module. The curved channels cause the air to turn and accelerate at a rate that exceeds the capability of the entrained water to stay suspended in the air. As a result of this process, the water impinges on the surface of the channel walls where it centrifugally separates from the air stream and combines to form droplets. As the droplets grow, they become large enough to overcome frictional forces in the air channels and fall back into the cooling tower cold water basin.

Figure 2:
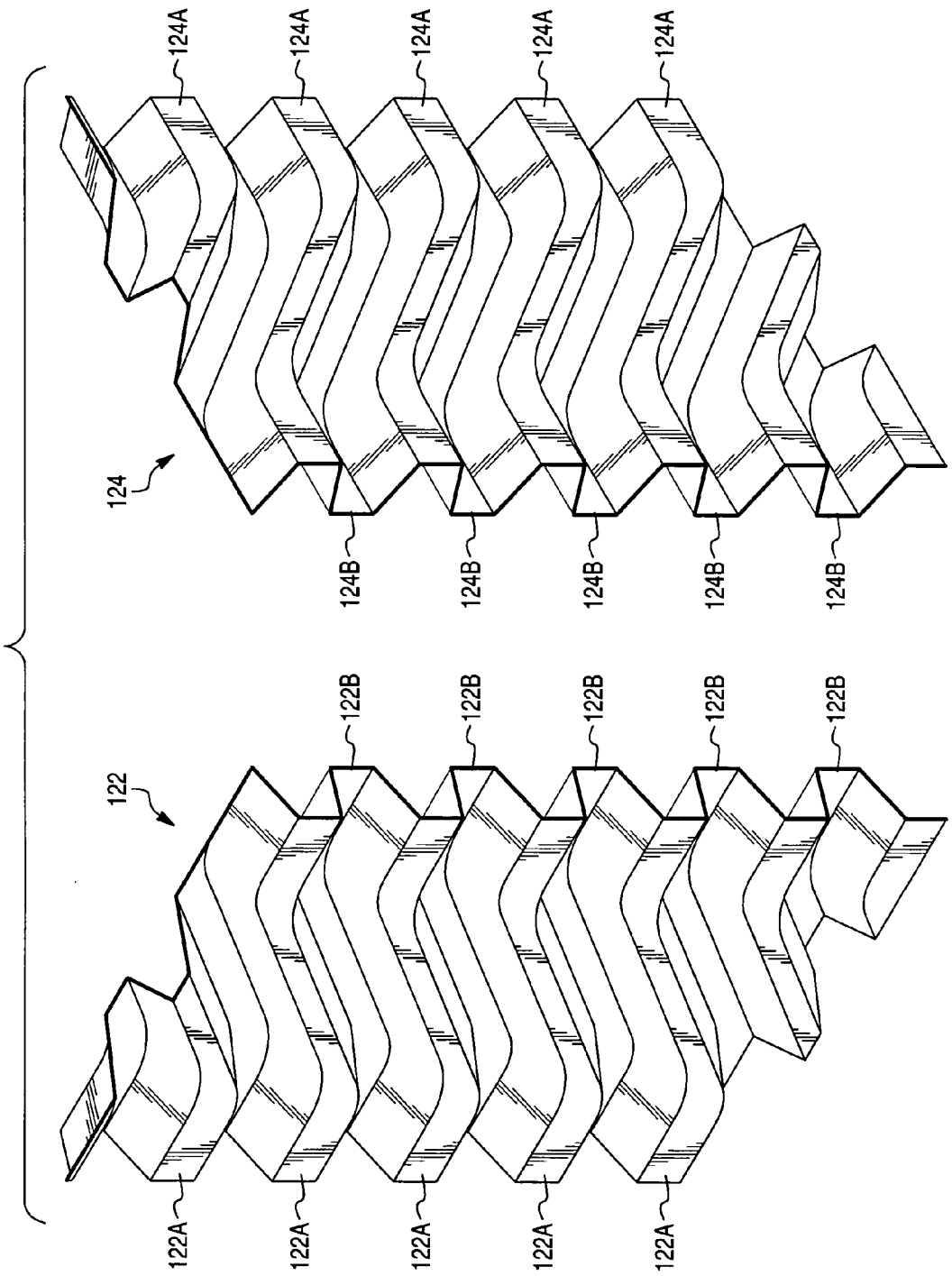
FIG. 2 is a side-by-side perspective view of two sheets used to form air channels of the type shown in FIG. 1.

FIG. 1 is a perspective view of an air channel module 120 containing a plurality of air channels 130. As shown in FIG. 2, the channels 130 are formed of two sheets 122, 124 which are substantially mirror images of each other. Each sheet 122, 124 has an undulating shape which defines a series of peaks 122A, 124A and troughs 122B, 124B which remain substantially parallel over the generally curved shaped. The sheets 122, 124 are precision formed using a vacuum thermoforming process such that the curved-shaped troughs 122B, 124B of the sheets 122, 124 are adapted to rest against each other over their length. As a result, the air channels 130 are formed between the peaks 122A, 124A. Moreover, by sealing the troughs 122B, 124B together over their lengths by any conventional bonding process (e.g., adhesive, melting, etc.), the channels 130 are substantially air-tight, i.e., the channels 130 have substantially no leaks which may otherwise enable water laden air to inadvertently pass through the air channel module 120 without having the water removed from it.

As shown in FIG. 1, the air channels 130 have a generally curved, sinusoidal shape. Water laden air enters the channels 130 at a lower inlet 132 and exits via an upper outlet 134, i.e., the water laden air flows generally in the direction indicated by arrows A, but experiences an upward rise in the process of flowing through the channels 130. As the water laden air passes through the channels 130, it travels upward through a narrow portion 136 in each of the channels 130. As the cross-sectional area of channels 130 is smaller in the narrow portions 136, the speed of the water laden air passing through the channels 130 is much greater than at the inlet 132 and outlet 134. Further, as a result of the combination of the increased speed and lower and upper turns 138, 139 in the channels 130, entrained water centrifugally impinges on the walls of the channels 130 and collects thereon. As the water collects, it forms droplets which, when they become large enough to overcome frictional forces, fall under the force of gravity down the narrow portion 136, out the inlet portion 132, and into the cooling tower cold water basin (not shown). As a result, the air exiting the outlets 134 contains less than about 0.01% (and preferably less than about 0.005%) of water by volume and, therefore, the air exiting the outlets 134 is substantially water-free.

Figure 3:
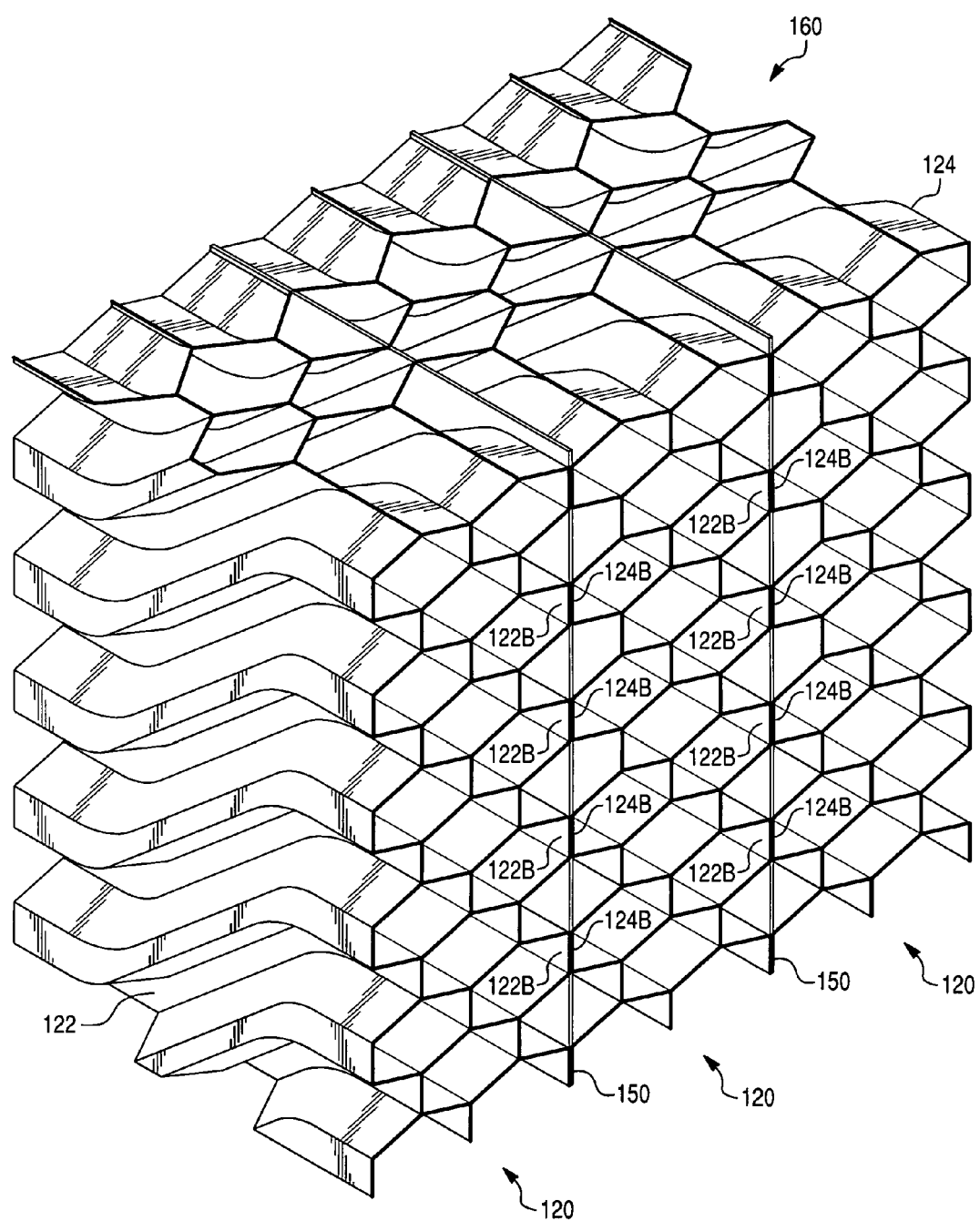
FIG. 3 is a perspective view of a series of air channel modules of the type shown in FIG. 1, wherein each of the air channel modules is separated by a flat sheet substantially uniformly affixed to the adjoining edges of the modules.

To add rigidity and stability to an air channels module 120, another air channel module 120 may be provided and separated by a flat sheet 150, as shown in FIG. 3. As a result of the high precision forming of the air channels 130, the flat sheets 150 may substantially and uniformly abut the troughs 122B, 124B of the air channels 130. Moreover, the flat sheets 150 may be bonded to the troughs 122B, 124B by any conventional bonding process (e.g., adhesive, melting, etc.). Regardless of the bonding process, when a plurality of air channel modules 120 are connected, the result is a first plurality of air channel modules 160 which may form the basis of constructing a larger drift eliminator 100.

Figure 4:
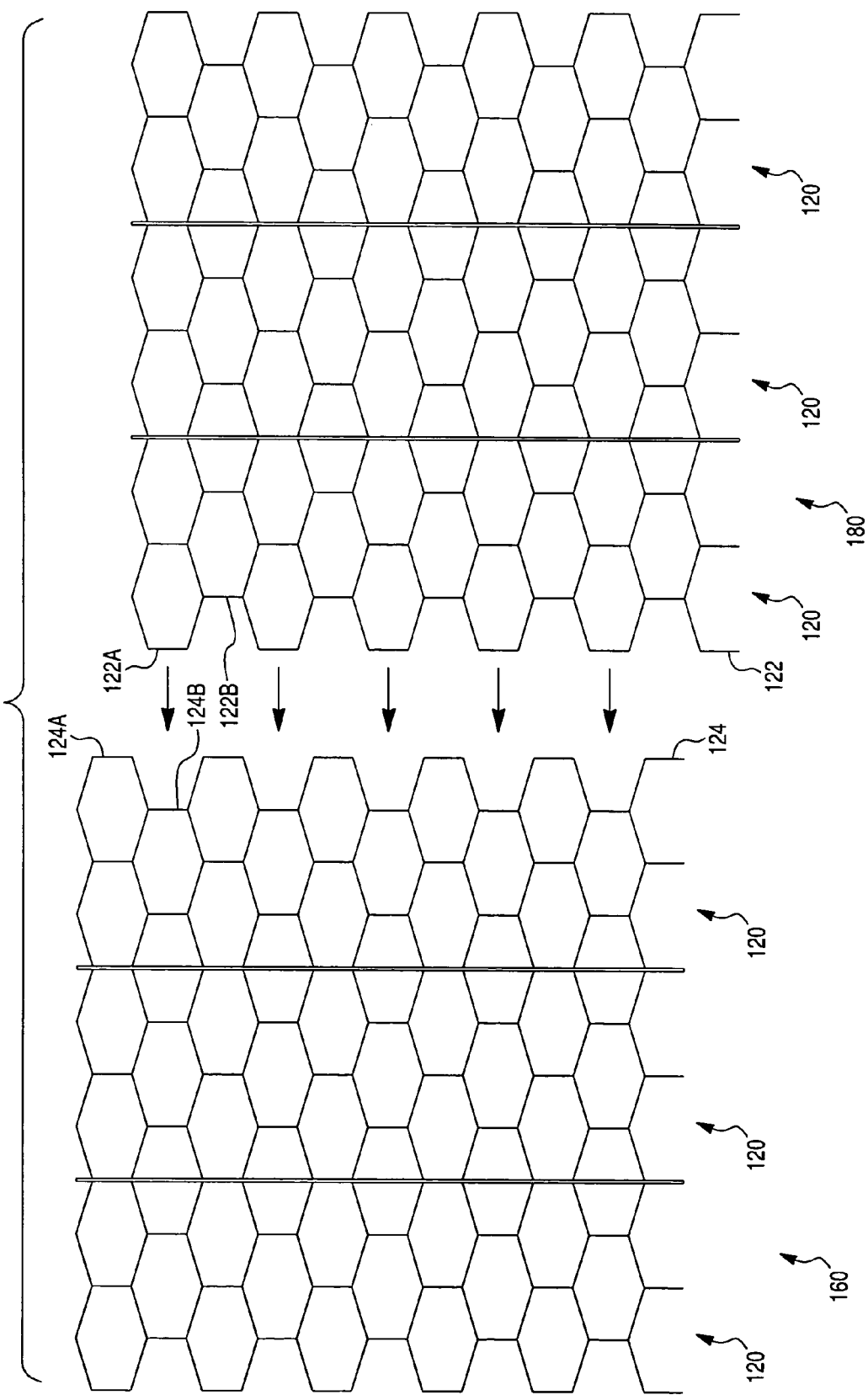
FIG. 4 is a side-by-side front view of two series of air channel modules of the type shown in FIG. 3.
Figure 5:
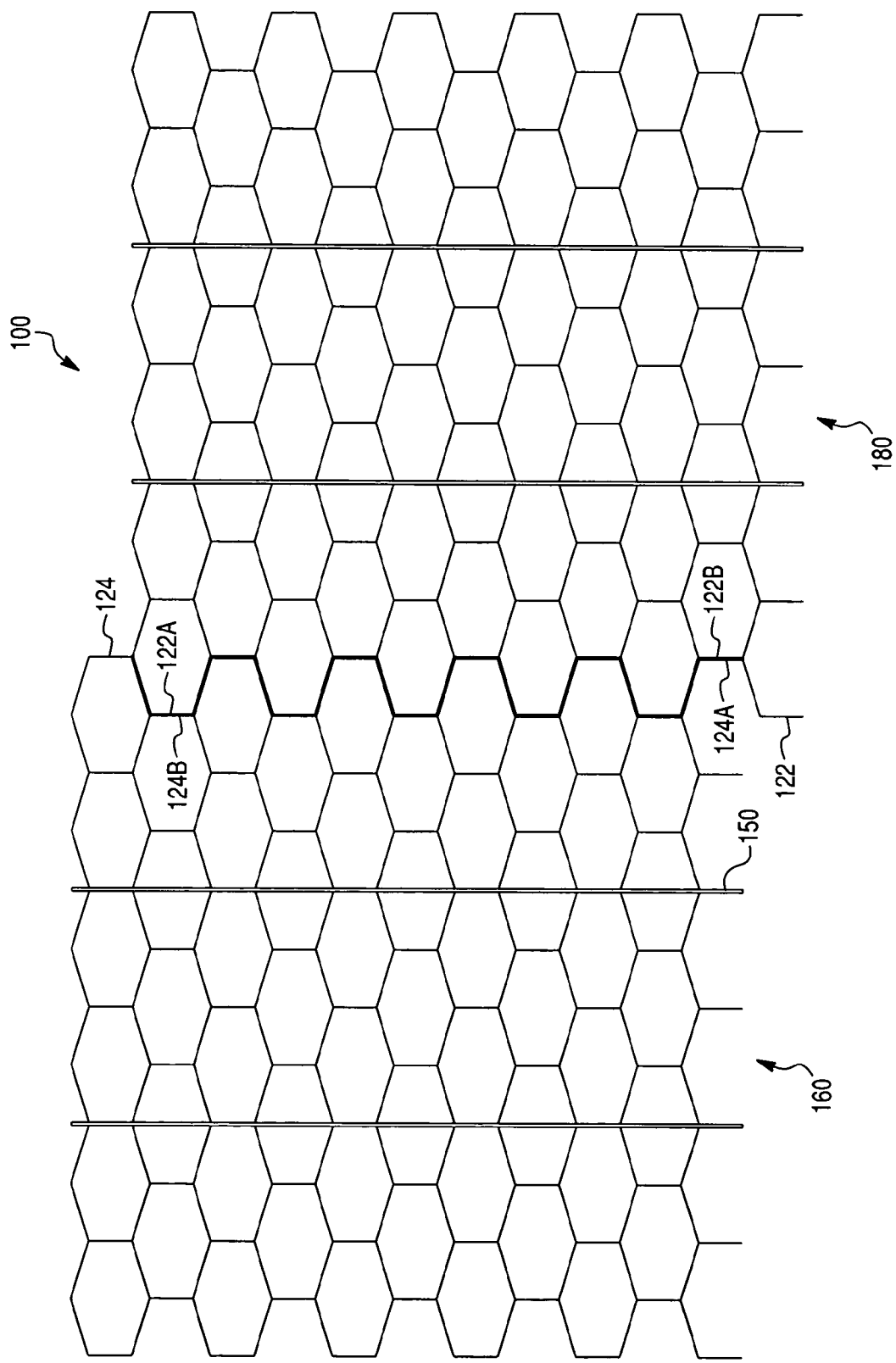
FIG. 5 is front view of the two series of air channel modules of FIG. 4 joined to each other by nesting the air channels on a right end of the left series in the air channels on the right end of the left series.

As shown in FIGS. 4 and 5, the first plurality of air channel modules 160 may be adapted to engage a second plurality of air channel modules 180. As can be seen, the far right sheet 124 of the first plurality of air channel modules 160 and the far left sheet 122 of the second plurality of air channel modules 180 may not have a flat sheet 150 affixed thereto. However, as a result of the precision by which the sheets 122, 124 are formed, the far left sheet 122 of the second plurality of air channel modules 180 may be nested in the far right sheet 124 of the first plurality of air channel modules 160.

In nesting the left sheet 122 in the right sheet 124, the peaks 124A of the left sheet 122 fit within and engage the troughs 124B of the other sheet 124 and vise versa, thereby forming a tight, tortuous seal between the adjoining modules 160, 180. The nesting sheet 122, 124 do not need to be bonded as a result of the precision to which the sheets 122, 124 are formed, i.e., the sheets 122, 124 nest completely such that they effectively seal themselves, provided that lateral movement of the modules 160, 180 is substantially prevented. Moreover, the nesting substantially eliminates any potential for gaps between the plurality of air channel modules 160, 180, thereby reducing the likelihood of leakage.

The tight engagement between the air channel modules 160, 180 eliminates the need for additional materials such as sealers, caulking, or glue to prevent the DRU 100 from leaking between the nested sheets 122, 124. As a result, the nesting (a) enhances the ability of the drift eliminator 100 to remove entrained water in the air flowing through the channels 130 and (b) prevents (or at least greatly reduces the likelihood of) an inadvertent pressure drop across the drift eliminator 100. Moreover, by preventing (or at least greatly reducing the likelihood of) a pressure drop, a cooling tower employing the drift eliminator conserves horsepower and, therefore, is more efficient.

Figure 6:
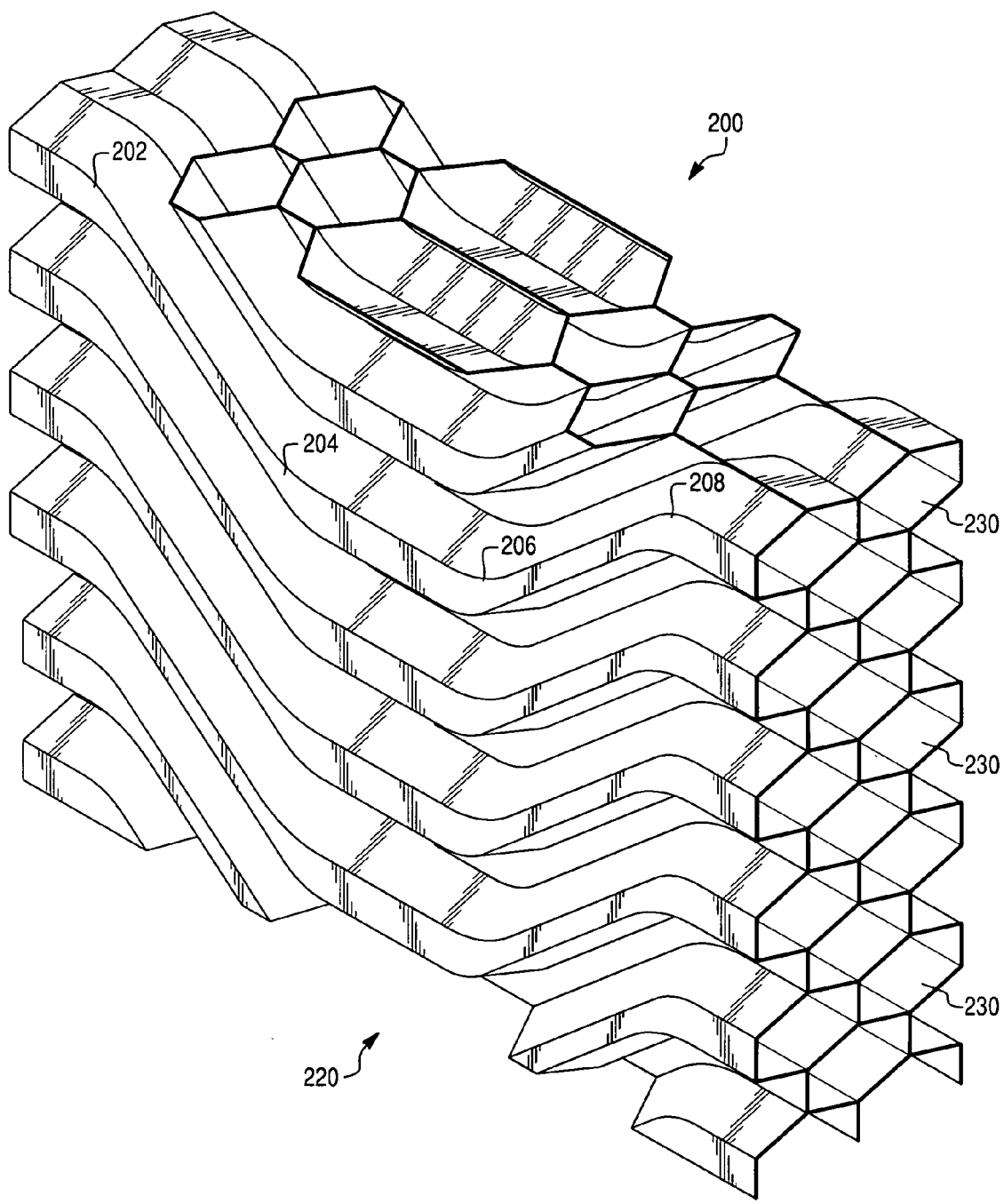
FIG. 6 is a side view of a double air channel module which enables air, but not light, to travel through the module.

Although unrelated to the aforementioned DRU embodiment 100, the same design principles which were used to create the drift eliminator 100 have also yielded a light trap 200, as shown in FIG. 6. In this light trap 200, air channels 230 are formed with four turns 202, 204, 206, 208. As a result of these turns 202, 204, 206, 208, air may travel through the channels 230 while substantially no light may pass through the channels 230. Although the light trap 200 is shown as having four turns 202, 204, 206, 208 in each air channel 230, it is to be understood the air channels may have fewer or more turns (e.g., the air channels 230 may have three or five turns), provided that the air channels are configured to prevent substantially all light from passing therethrough.

In addition, as a result of the ability of the air channel modules 230 to nest together in the manner previously described, substantially no light is able to pass through a light trap 200 comprising a plurality of air channel modules 220. As air, but substantially no light, is adapted to travel through the light trap 200, the light trap 200 is an effective ventilating apparatus for use in chicken houses.

Although the aforementioned describes embodiments of the invention, the invention is not so restricted. It will be apparent to those skilled in the art that various modifications and variations can be made to the disclosed embodiments of the present invention without departing from the scope or spirit of the invention. For example, the invention may be adapted to other applications in which water or vapor needs to be removed from a gas (e.g., air) such as, for example, in scrubbers, refineries, chemical treatment facilities, etc. Similarly, although the sheets 122, 124 described herein are made by vacuum thermoforming PVC, other suitable materials (and method of forming them) may be used such as, for example, other plastics, stainless steel, etc. Accordingly, these other drift eliminators and light traps and the methods of forming them are fully within the scope of the claimed invention. Therefore, it should be understood that the apparatus described herein is illustrative only and is not limiting upon the scope of the invention, which is indicated by the following claims.

What is claimed is:

1. A drift eliminator comprising:
   a first plurality of air channel modules comprising:
      a first plurality of sheets having an undulating shape creating a series of alternating peaks and troughs;
      a second plurality of sheets having an undulating shape creating a series of alternating peaks and troughs,
      wherein the sheets of the first and second pluralities of sheets of the first plurality of air channel modules are alternately stacked, and
      wherein the troughs of the sheets in the first and second pluralities of sheets of the first plurality of air channel modules abut each other, thereby creating air channels between the peaks of the first and second pluralities of sheets of the first plurality of air channel modules;
   a second plurality of air channel modules comprising:
      a first plurality of sheets having an undulating shape creating a series of alternating peaks and troughs;

a second plurality of sheets having an undulating shape creating a series of alternating peaks and troughs;
wherein the sheets of the first and second pluralities of sheets of the second plurality of air channel modules are alternately stacked, and
wherein the troughs of the sheets in the first and second pluralities of sheets of the second plurality of air channel modules abut each other, thereby creating air channels between the peaks of the first and second pluralities of sheets of the second plurality of air channel modules; and
at least one planar sheet positioned between two of the air channel modules in the first plurality of air channel modules,
wherein the drift eliminator is configured to remove at least about 99.99% by volume of entrained water in air, which flows through the air channels, and
wherein a last sheet of the first plurality of air channel modules is nested in a primary sheet of the second plurality of air channel modules so that substantially no gap is formed between the last sheet and the primary sheet.

2. The drift eliminator according to claim 1, wherein the air passing through the air channels travels in a non-linear path.

3. The drift eliminator according to claim 2, wherein the non-linear path has at least one portion which defines an upward direction.

4. The drift eliminator according to claim 1, further comprising:
at least one planar sheet positioned between two of the air channel modules in the second plurality of air channel modules.

5. The drift eliminator according to claim 4,
wherein a planar sheet is between each of the air channel modules in the first plurality of air channel modules, and
wherein a planar sheet is between each of the air channel modules second plurality of air channel modules.

6. The drift eliminator according to claim 1, wherein the last sheet of the first plurality of air channel modules and the primary sheet of the second plurality of air channel modules are effectively joined without being bonded, glued, sealed, or caulked.

7. The drift eliminator according to claim 6, wherein as a result of the last sheet of the first plurality of air channel modules being nested in the primary sheet of the second plurality of air channel modules, a substantially airtight seal is created between the last sheet of the first plurality of air channels and the primary sheet of the second plurality of air channels, provided that lateral movement of the first and second air channel modules is substantially inhibited.

8. The drift eliminator according to claim 1, wherein the first and second pluralities of air channel modules are formed of a vacuum thermoformed material.

9. A drift eliminator comprising:
a first plurality of air channel modules comprising:
a first plurality of sheets having an undulating shape creating a series of alternating peaks and troughs;
a second plurality of sheets having an undulating shape creating a series of alternating peaks and troughs,
wherein the sheets of the first and second pluralities of sheets of the first plurality of air channel modules are alternately stacked,
wherein a planar sheet is between each of the air channel modules in the first plurality of air channel modules, and
wherein the troughs of the sheets in the first and second pluralities of sheets of the first plurality of air channel modules abut each other, thereby creating air channels between the peaks of the first and second pluralities of sheets of the first plurality of air channel modules;
a second plurality of air channel modules comprising:
a first plurality of sheets having an undulating shape creating a series of alternating peaks and troughs;
a second plurality of sheets having an undulating shape creating a series of alternating peaks and troughs,
wherein the sheets of the first and second pluralities of sheets of the second plurality of air channel modules are alternately stacked,
wherein a planar sheet is between each of the air channel modules second plurality of air channel modules, and
wherein the troughs of the sheets in the first and second pluralities of sheets of the second plurality of air channel modules abut each other, thereby creating air channels between the peaks of the first and second pluralities of sheets of the second plurality of air channel modules,
wherein the drift eliminator is configured to remove at least about 99.99% by volume of entrained water in air, which flows through the air channels, and
wherein a last sheet of the first plurality of air channel modules is nested in a primary sheet of the second plurality of air channel modules so that substantially no gap is formed between the last sheet and the primary sheet.

10. The drift eliminator according to claim 9, wherein the first and second pluralities of air channel modules are formed of a vacuum thermoformed material.

11. An apparatus comprising:
a first plurality of air channel modules comprising:
a first plurality of sheets having an undulating shape creating a series of alternating peaks and troughs;
a second plurality of sheets having an undulating shape creating a series of alternating peaks and troughs,
wherein the sheets of the first and second pluralities of sheets of the first plurality of air channel modules are alternately stacked, and wherein the troughs of the sheets in the first and second pluralities of sheets of the first plurality of air channel modules abut each other, thereby creating the air channels between the peaks of the first and second pluralities of sheets of the first plurality of air channel modules; and
a second plurality of air channel modules comprising:
a first plurality of sheets having an undulating shape creating a series of alternating peaks and troughs;
a second plurality of sheets having an undulating shape creating a series of alternating peaks and troughs,
wherein the sheets of the first and second pluralities of sheets of the second plurality of air channel modules are alternately stacked, and wherein the troughs of the sheets in the first and second pluralities of sheets of the second plurality of air channel modules abut each other, thereby creating the air channels between the peaks of the first and second pluralities of sheets of the second plurality of air channel modules,
wherein a last sheet of the first plurality of air channel modules is nested in a primary sheet of the second plurality of air channel modules such that substantially no gap is created between the last sheet and the primary sheet.

12. The apparatus according to claim 11, further comprising:
at least one planar sheet positioned between two of the air channel modules in the first plurality of air channel modules; and
at least one planar sheet positioned between two of the air channel modules in the second plurality of air channel modules.

13. The apparatus according to claim 11,
wherein a planar sheet is between each of the air channel modules in the first plurality of air channel modules, and
wherein a planar sheet is between each of the air channel modules second plurality of air channel modules.

14. The apparatus according to claim 11, wherein the air passing through the air channels travels in a non-linear path.

15. The apparatus according to claim 14, wherein the non-linear path has at least one portion which defines an upward direction.

16. The apparatus according to claim 11, wherein the apparatus is configured to remove at least about 99.99% by volume of entrained water in air, which flows through the air channels in the first and second pluralities of air channel modules.

17. The apparatus according to claim 16, wherein the apparatus is configured to remove at least about 99.995% by volume of entrained water in air, which flows through the air channels in the first and second pluralities of air channel modules.

18. The apparatus according to claim 11, wherein the air channels are configured such that substantially no light may pass through the air channels.

19. The apparatus according to claim 11, wherein the first and second pluralities of air channel modules are formed of a vacuum thermoformed material.

20. The apparatus according to claim 11, wherein the apparatus is configured to be a drift eliminator or a light trap.

21. The apparatus according to claim 20, wherein each of the air channels of the first and second pluralities of air channel modulescomprises at least three turns or at least four turns.

22. The apparatus according to claim 20, wherein the first and second pluralities of air channel modules are formed of a vacuum thermoformed material.

23. The apparatus according to claim 20, wherein the light trap is configured to be used in a chicken house.

24. A method of forming an apparatus comprising the steps of:
providing a first plurality of air channel modules, the first plurality of air channel modules having a last sheet;
providing a second plurality of air channel modules, the second plurality of air channel modules having a primary sheet; and
nesting the primary sheet in the last sheet such that substantially no gap is created between the primary sheet and the last sheet, thereby forming an apparatus.

25. The method according to claim 24, further comprising the step of:
inputting water laden air into the apparatus; and
exhausting air from the apparatus, wherein the exhausted air contains less than about 0.01% of water by volume.

26. The method according to claim 25, wherein the exhausted air contains less than about 0.005% of water by volume.

27. The method according to claim 24, wherein the first plurality of air channel modules comprises a plurality of sheets, and wherein the method further comprises the steps of:
thermoforming the plurality of sheets of the first plurality of air channels; or
vacuum-forming the plurality of sheets of the first plurality of air channels.

28. The method according to claim 27, wherein the second plurality of air channel modules comprises a plurality of sheets, and wherein the method further comprises the steps of:
thermoforming the plurality of sheets of the second plurality of air channels; or
vacuum-forming the plurality of sheets of the second plurality of air channels.

29. The method according to claim 24, wherein the apparatus is configured to be a drift eliminator or a light trap.

30. A method comprising the steps of:
providing a first plurality of air channel modules, the first plurality of air channel modules having a last sheet;
providing a second plurality of air channel modules, the second plurality of air channel modules having primary sheet;
nesting the primary sheet in the last sheet such that substantially no gap is created between the primary sheet and the last sheet, thereby forming a drift eliminator;
inputting water laden air through the drift eliminator; and
exhausting air from the apparatus,
wherein the exhausted air contains less than about 0.01% of water by volume.

31. The method according to claim 30, wherein the exhausted air contains less than about 0.005% of water by volume.

* * * * *